June 23, 1936.   H. T. AVERY ET AL   2,044,978
CALCULATING MACHINE
Filed Aug. 18, 1931    7 Sheets-Sheet 1
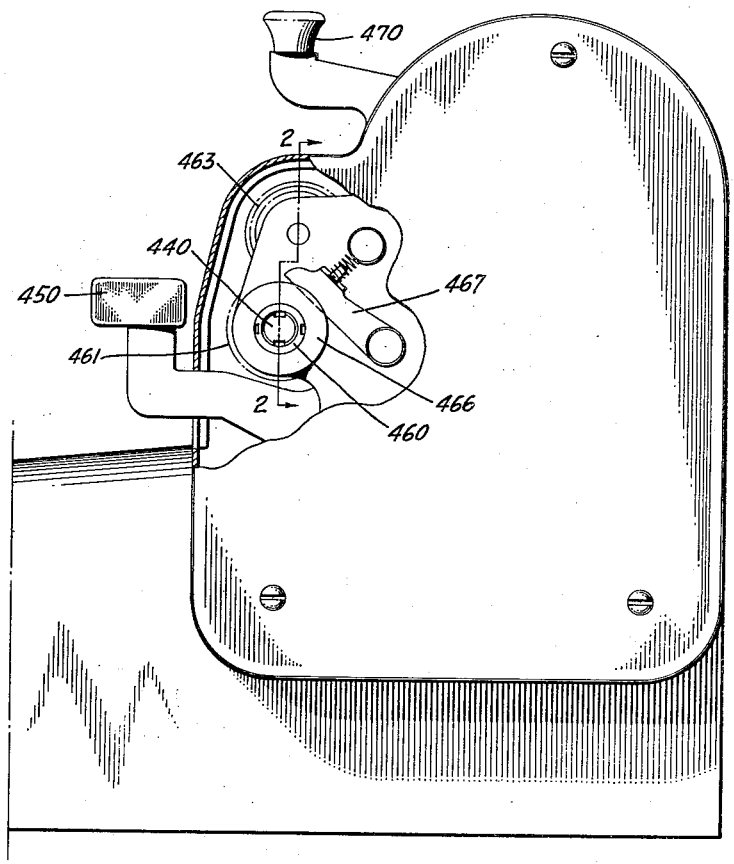
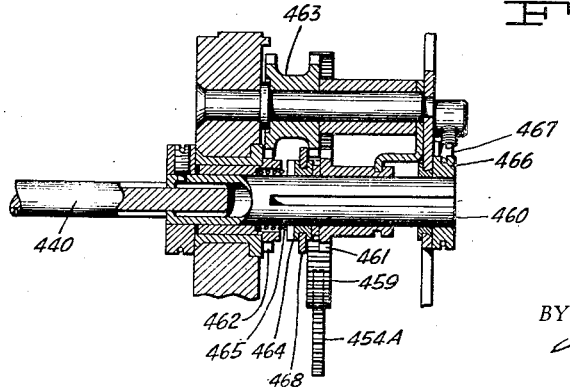
INVENTORS
Harold T. Avery
Gustav Lerch
BY
ATTORNEY.

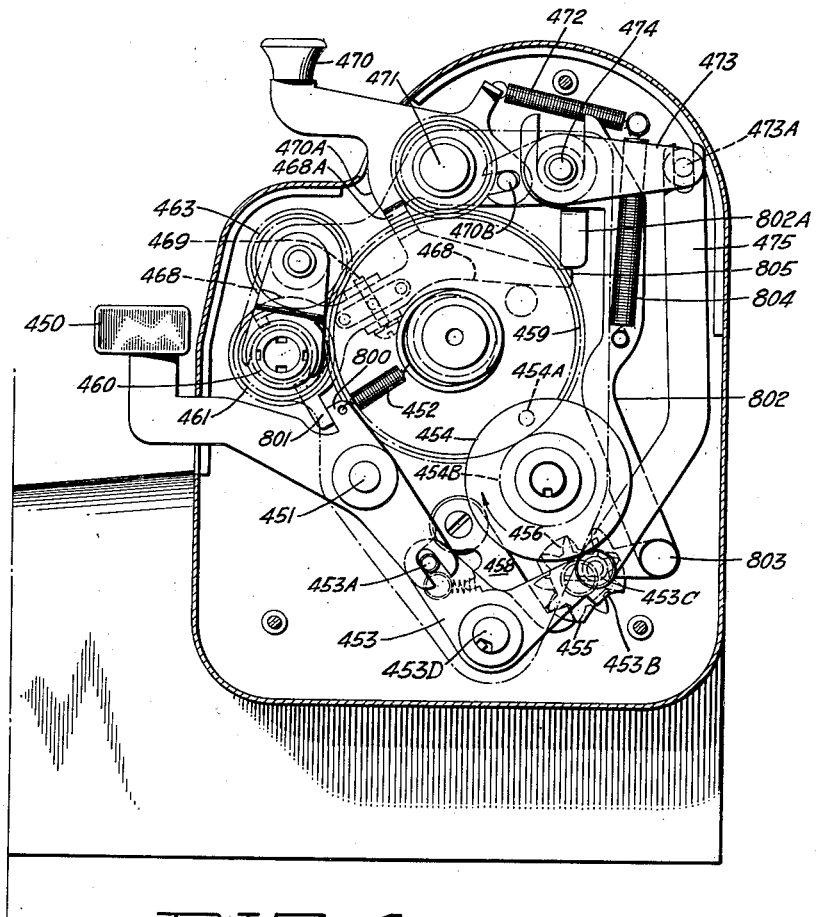

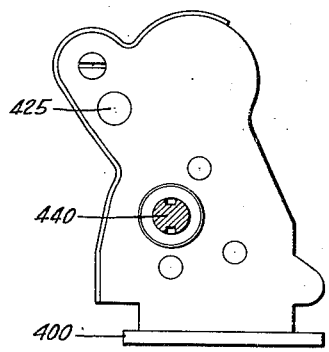
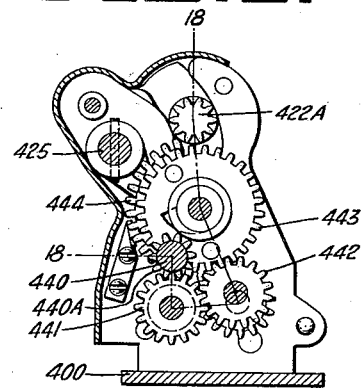
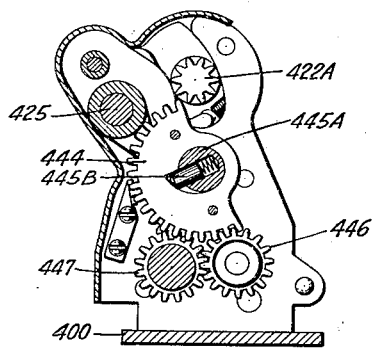
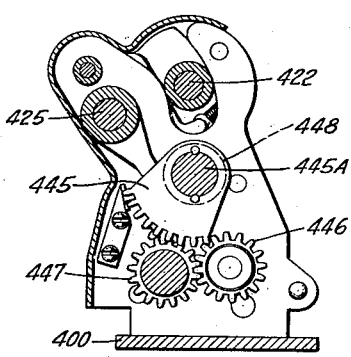
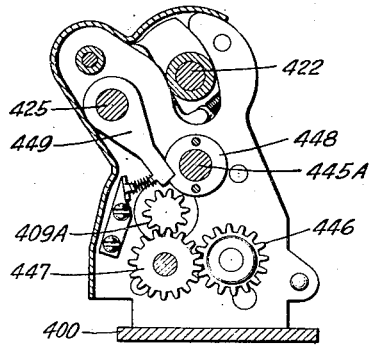
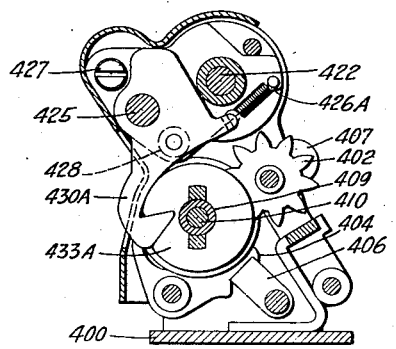

June 23, 1936.  H. T. AVERY ET AL  2,044,978
CALCULATING MACHINE
Filed Aug. 18, 1931  7 Sheets-Sheet 4
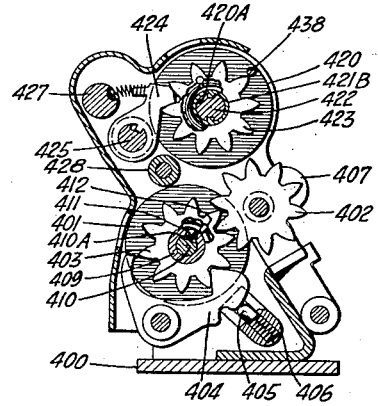
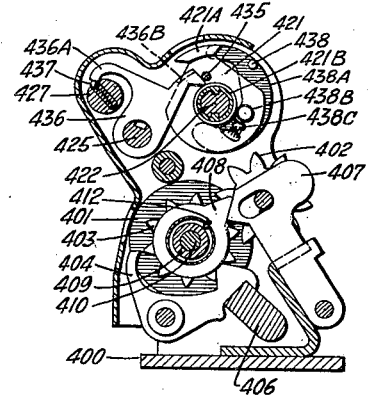
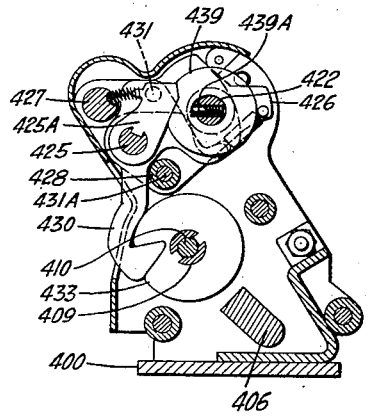
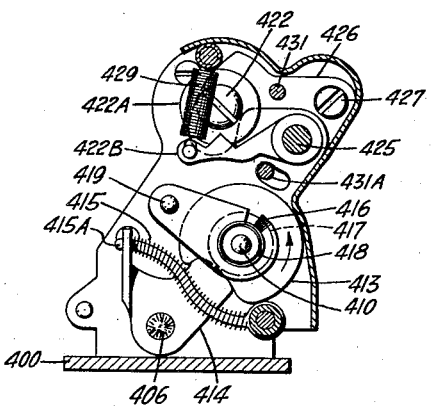
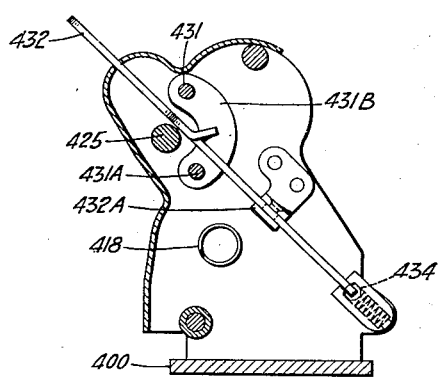
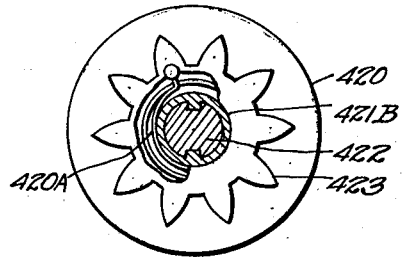
INVENTORS
Harold T. Avery
Gustav Lerch
BY
ATTORNEY.

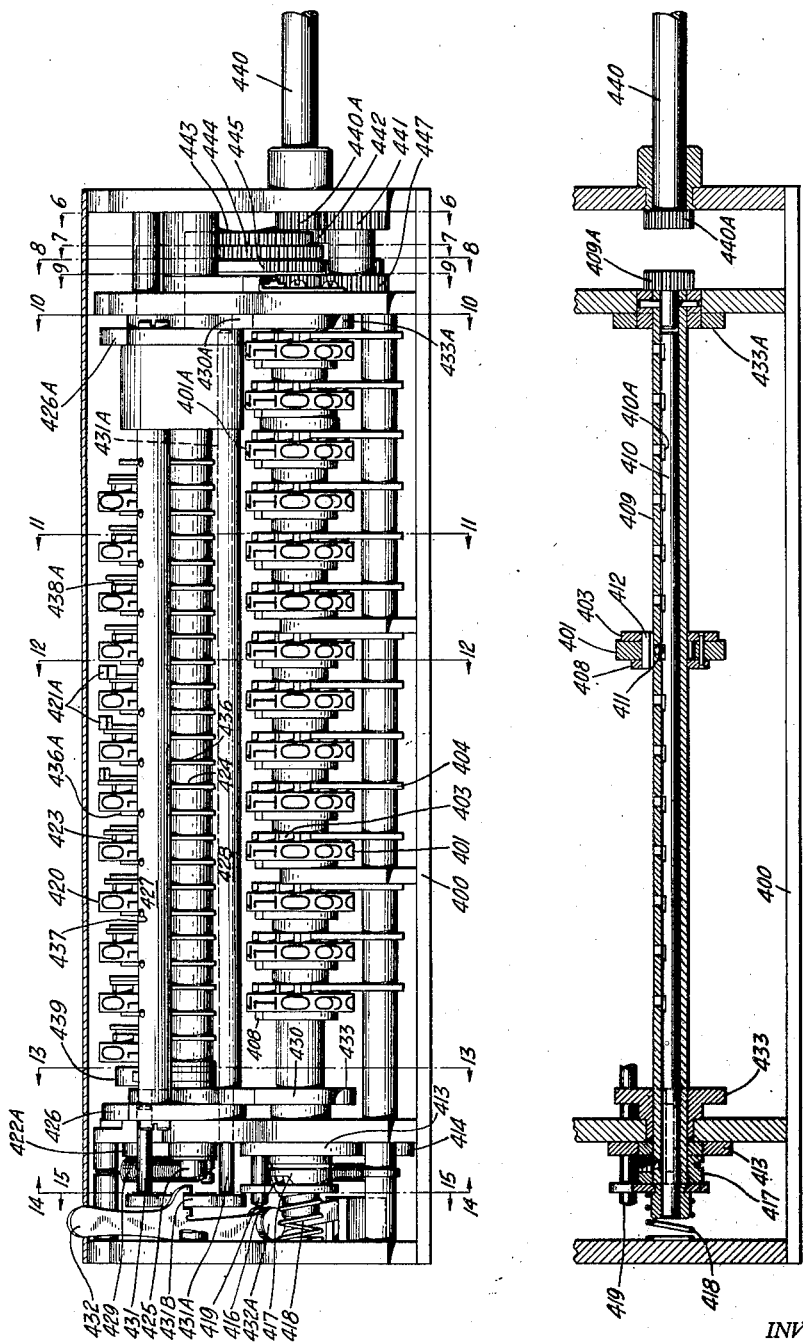

June 23, 1936.　　　H. T. AVERY ET AL　　　2,044,978
CALCULATING MACHINE
Filed Aug. 18, 1931　　　7 Sheets-Sheet 6

INVENTORS
Harold T. Avery
Gustav Lerch
BY
ATTORNEY.

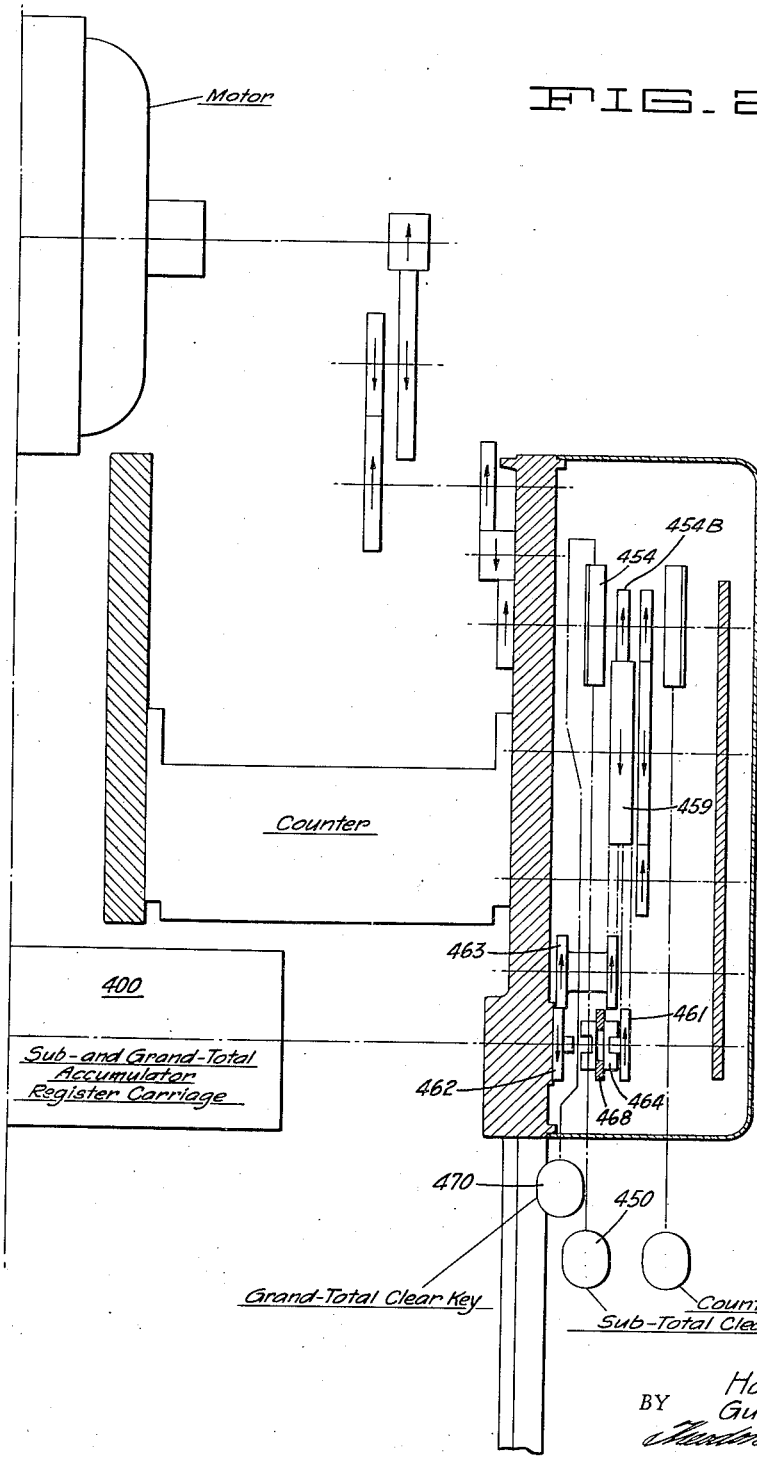

Patented June 23, 1936

2,044,978

UNITED STATES PATENT OFFICE 2,044,978

CALCULATING MACHINE

Harold T. Avery and Gustav Lerch, Oakland, Calif., assignors to Marchant Calculating Machine Company, a corporation of California Application August 18, 1931, Serial No. 557,800

9 Claims. (Cl. 235—144)

The present invention relates to calculating machines adapted to perform the four cardinal calculating operations and combinations thereof, but particularly to the type embodying two separate and distinct accumulating registers; one for registering separate or sub-totals, and the other for registering the accumulated sum of a plurality of said totals, or a grand-total.

It is an object of the present invention to provide a dependable mechanism whereby automatic clearance of either of the duplex accumulating registers may be optionally accomplished through a single train of driving mechanism.

Another object of the invention is to provide improved frictional drive resetting means for registering mechanism.

Another object of the invention is to provide a register in which the numeral wheels, the resetting means and the tens carrying means therefor are mounted on a common shaft, operation of said resetting or tens carrying means being selected by the direction of rotation of said shaft.

Another object of the invention is to provide improved means for transferring values from one register to another.

Another object of the invention is to provide improved clutch means which automatically remain effective during a plurality of cycles of operation thereof.

Another object of the invention is to provide suitable interlocking means between a plurality of control keys which are adapted to initiate operation of a common driving train.

Other objects will appear as the description progresses.

The invention possesses a plurality of advantageous features, some of which will be set forth at length in the following description, where that form of the invention which has been selected for illustration in the drawings accompanying and forming a part of the present specification will be described in full. In said drawings, one form of the apparatus embodying the invention has been shown but it is to be understood that the invention has not been limited to such form, since the invention, as set forth in the claims, may be embodied in a plurality of other forms.

Referring to the accompanying drawings:

Figure 1 is a right side view of a portion of the calculating machine, part of the casing being broken away to show an end view of a mechanism composing part of the present invention, and the centralizer therefor.

Figure 2 is a section taken on the line 2—2 of Figure 1.

Figure 3 is a right side view of that portion of the machine showing the duplex register clear keys and associated mechanism.

Figure 4 is an end view of the triple rotation mechanism therefor.

Figure 5 is a right end view of the transversely displaceable carriage shown in Figure 16, upon which the two accumulator registers are mounted.

Figure 6 is a section taken on line 6—6 of Figure 16.

Figure 7 is a section taken on line 7—7 of Figure 16.

Figure 8 is a section taken on line 8—8 of Figure 16.

Figure 9 is a section taken on line 9—9 of Figure 16.

Figure 10 is a section taken on line 10—10 of Figure 16.

Figure 11 is a section taken on line 11—11 of Figure 16.

Figure 11A is an enlarged detail view partially broken away to show the mounting of the grand totalizer numeral wheels.

Figure 12 is a section taken on line 12—12 of Figure 16.

Figure 13 is a section taken on line 13—13 of Figure 16.

Figure 14 is a section taken on line 14—14 of Figure 16.

Figure 15 is a section taken on line 15—15 of Figure 16.

Figure 16 is a front view of the carriage showing the two accumulator registers and associated mechanisms.

Figure 17 is a section through the shaft of the sub-total accumulating register showing the mechanism for clearing the dials.

Figure 20 is a diagrammatic view showing the driving means for the various clearing mechanisms.

Figure 18:
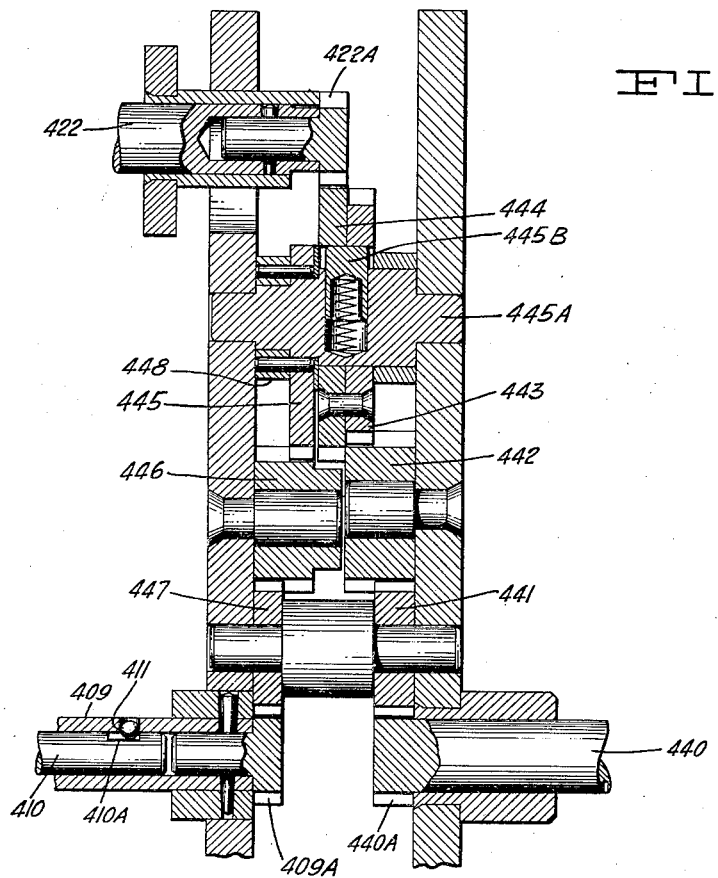
Figure 18 is an enlarged, developed section of the duplex register gearing arrangement taken substantially on the irregular line 18—18 of Figure 6, with certain parts not on the section line included to better illustrate the clutching mechanism employed between several gears for proper operation of the grand-total numeral wheel shaft.

It is manifest that the invention may be embodied in any calculating machine of the type described above; however, in the accompanying drawings, the invention is shown embodied in an electrically driven machine of the general type disclosed in the patent to Friden, Number 1,643,710 dated September 27, 1927, and the application of Friden, Serial Number 246,677, filed May 20, 1929, to which reference is hereby made for a complete disclosure of such mechanisms as are not described herein since features of the calculating machine not involved in the present invention are not disclosed in this application.

The present invention relates particularly to the incorporation in the machine of a driving mechanism whereby either of the two accumulating registers may be optionally cleared by the depression of keys provided therefor without affecting the other. The machine shown in the above mentioned patent and in the present application is arranged to be driven by an electric motor, but it is to be understood that the invention is equally well applicable to a hand driven machine in which a single reversibly operable crank handle is adapted to clear one register by movement in one direction and the other register by movement in the opposite direction.

The calculating machine comprises a suitable frame upon which are arranged the various instrumentalities which cooperate to produce a complete calculating machine of this type. It includes a reversible rotary actuator, which is fully described in said patent, and into which values are introduced by any suitable means. Upon rotation of said actuator, the introduced values are transferred to the numeral wheels of the sub-total register, which, with the grand-total register, is mounted in a carriage, disposed in parallel displaceable relation to the axis of the actuator, for the purpose of making direct action of the selected values on the numeral wheels of highest value possible.

The sub-total register

The calculating machine embodies a rotary actuator, such as is disclosed in the above mentioned patent, into which values may be introduced by any suitable means. On rotation of the actuator, the introduced values are transmitted to the numeral wheels 401 (Figures 11 and 16) by means of the gears 403 secured to said numeral wheels and driven by the intermediate gears 402. The ten-tooth gears 403 are engaged by a series of escapement pawls 404 to provide step by step movement of the numeral wheels 401, prevent their overthrow, and place them in the proper engaging position with the actuator. The pawls 404 are normally held in spring pressed engagement with the gears 403 by the spring pressed members 405 which are mounted in an oscillatory comb 406, said comb being journaled at its ends so that it may be rotated to move the members 405 out of contact with the pawls 404, thereby permitting free rotation of the gears 403 and their integral numeral wheels 401 during a clearance operation.

The tens transfer mechanism associated with the subtotal register is of the wellknown type in which each numeral wheel is provided with a transfer lever 407 (Figure 12) which is moved to operating position by a projection 408 carried by the numeral wheels and which is returned to inoperative position by a restoring cam secured to the actuator. While the transfer levers 407 are in operative position, rotation of the actuator serves to move the numeral wheel of the next higher order one step by means of tens carrying pins carried by said actuator and moved laterally by camming surfaces provided on the transfer levers. This is well understood in the art, and is fully disclosed in the above mentioned patent.

Zero resetting mechanism

The dials 401 (Figures 11 and 17) are rotatably mounted on a normally stationary sleeve 409 in which is disposed a normally stationary shaft 410 provided with short depressions 410A in direct longitudinal alinement with the teeth 412, one of which is disposed in an enlarged bore of each dial. The grooves 410A are normally in radial alinement with a series of holes, in each of which is disposed a ball 411 so that a longitudinal movement of the shaft 410 inside of the sleeve 409 will force said balls out of their grooves 410A and beyond the periphery of the sleeve 409 in which position they will contact the teeth 412 upon rotation of said sleeve. The longitudinal movement of the shaft 410 is so timed with the clockwise rotation of the sleeve 409 that the balls 411 are past the zero position of the tooth 412 (Figures 11 and 17) before such movement occurs. Therefore, all dials rotated out of zero position are carried back to said position by a complete revolution of the sleeve 409.

Means are provided whereby the initial rotation of this sleeve 409 will release the pawls 404 and effect the necessary longitudinal movement of the shaft 410. Secured to the end of the zero resetting sleeve 409 is a disk 413 (Figure 14) having a depression in its periphery in which an arm of lever 414 seats when the sleeve 409 is at neutral position. The arm of the lever 414 is held in the depression by a spring 415 surrounding the pivoted rod 415A. The lever 414 is secured to the end of the comb 406 (Figure 11) so that as the lever 414 is rocked upon initial rotation of the zero resetting sleeve 409, the comb 406 is also rocked to move the spring pressed members 405 out of contact with the pawls 404, thereby removing the resistance to free rotation from the numeral wheels 401 until a full revolution of the zero resetting sleeve 409 has been completed when the comb 406 is rocked back to normal position permitting the reapplication of spring pressure to the pawls 404.

The longitudinal movement of the shaft 410 to force the balls 411 into contact with the teeth 412 is effected upon initial rotation of the zero resetting sleeve 409 by a worm cam 416 (Figures 14 and 16) secured to the shaft 410, the extrusion of said worm cam being normally held in a depression in the side of a hub 417 by a spring 418, and held against rotation by a stud 419 on which one end of the cam 416 is slidably supported. The hub 417 is secured to the zero resetting sleeve 409 and the depression in its side is of sufficient length to permit rotation of the balls 411 past the tooth 412 (Figure 11) before the worm cam 416 is forced out of the depression in hub 417 causing a longitudinal movement of the shaft 410 against the spring 418. Therefore, it is obvious, that a clockwise revolution of the zero resetting sleeve as shown in Figure 11 releases the pawls 404, forces the balls 411 out to contact the teeth 412 of any partly rotated dials and results in their being carried around to zero position where all parts are again restored to normal. The driving means for this clearance mechanism will be described hereinafter.

The grand total register

The grand total register, pivotally disposed on the carriage 400 above the sub-total register comprises a series of numeral wheels 420 (Figures 11 and 16) each rotatably mounted on the hub 421B of an adjacent member 421, which is keyed to a normally stationary shaft 422. Each of the numeral wheels 420 is provided on one side with a ten-tooth gear 423, normally out of engagement with the intermediate gear 402, but arranged to mesh with this gear to perform a transferring operation, as will be disclosed hereinafter. The ten-tooth gears 423 are engaged by spring pressed pawls 424 to provide a step by step movement of the numeral wheels 420, prevent overthrow, and place the gear in proper engaging position with the intermediate gear 402. The numeral wheels of the grand total register are preferably in alinement with the numeral wheels in the sub-total register, except that in the present instance, there are no numeral wheels in the grand total register associated with the three lowest order numeral wheels in the sub-total register. Said lowest order numeral wheels, beginning with 401A (Figure 16), being used for the accumulation of mills, tenths of mills, and hundredths of mills, no means are provided for transferring their actual value to the grand total register. Means are provided, however, whereby, if the accumulated values of these three numeral wheels results in five or more mills being registered on the numeral wheel 401A, one unit is transferred to the grand total register, which would otherwise be unaffected by these mills dials.

*Total transfer*

The entire grand total register is pivotally mounted on a shaft 425 (Figure 13) and is so arranged that upon initiating a resetting operation of the sub-total numeral wheels 401, it may be rocked downward a sufficient distance to engage gears 423 with the intermediate gears 402, whereby the value being cleared out of the sub-total numeral wheels may be transferred to the grand total numeral wheels.

The mechanism composing the grand total register is mounted in a frame work comprising two end pieces 426 and 426A (Figure 16) which are journaled on the normally stationary shaft 425 (Figure 13), and carry the shaft 427 and the sleeve 428, said register being normally held in an elevated position by a spring 429 (Figures 14 and 16). Two depending levers 430 (Figure 13) and 430A (Figure 10), also pivotally mounted on the shaft 425, are optionally locked to the end pieces 426 and 426A by the pins 431 and 431A, (see Figures 15 and 16) and the projections on the lower extremities of these levers are normally held by spring tension in depressions provided on the peripheries of the cams 433 and 433A, which cams are securely keyed to the zero resetting sleeve 409. Pin 431 may be slid through a hole in end piece 426 to engage a seat in lever 430, while pin 431A may be slid longitudinally through sleeve 428 carried by end pieces 426 and 426A into a seat in lever 430A. To prevent interference between the pin 431A in the side frame, an elongated slot is provided as shown in Figure 14; this pin does not engage the lever 430, its relation thereto being clearly shown in Figure 13. It is obvious that the initial clockwise rotation of the sub-total zero resetting sleeve 409 will result, therefore, in a rocking of the grand-total register to mesh the gears 423 and 402, and that continued rotation to the completion of a full revolution results in a transfer of the values being cleared out of the sub-total register through the intermediate gears and into the grand-total register where they are correctly added to any previously registered amount through means of the grand-total tens transfer mechanism to be described hereinafter.

Means are provided whereby the above described transferring operation from the sub-total register to the grand-total register can be optionally disabled permitting the clearance of the sub-total register without transferring its accumulated value to the grand-total register. The pins 431 and 431A (Figures 15 and 16) that lock the depending cam levers 430 and 430A to the plates 426 and 426A to effect the rocking operation of the grand-total register, are longitudinally shiftable by means of a plate 431B secured to their ends and disposed between a bifurcated projection of a lever 432. The lever 432 can be rocked on its pivot point 432A in either of two longitudinal positions where it is resiliently held by means of a spring pressed ball 434 that contacts its lower extremity. In Figure 16, the lever 432 is shown rocked in its left hand position which holds the pins 431 and 431A out of their respective seats in the cam levers 430 and 430A, thereby permitting said cam levers to be rocked by their respective cams without effecting a similar rocking movement of the grand total register.

*Tens carrying mechanism*

In order to correctly accumulate a plurality of transferred values in the grand-total register, it is necessary that said register be provided with unitary tens carrying means. The tens carrying members for the successive numeral wheels are spaced a sufficient angular distance apart about the shaft on which they are mounted so that they are brought into operation successively during the rotation of said shaft. It has been found that the angular spacing necessary for more than nine numeral wheels exceeds 360 degrees, therefore, since it is usually desirable to provide a grand-total register having at least twelve numeral wheels, means are provided for giving the shaft 422 two complete tens carrying revolutions from its neutral position where it is held by a spring tensioned pawl 422B (Figure 14) engaging a cam 422A integral with said shaft. The means whereby the shaft 422 is given two tens carrying revolutions after each transferring operation will be described hereinafter.

The tens carrying mechanism for the grand-total register, as shown in the accompanying drawings, comprises a projection 435 (Figure 12) provided on the side of each numeral wheel opposite its gear 423 (Figure 11) and adjacent the numeral wheel of the next higher order. At zero position, as shown in Figure 12, this projection 435 is disposed against the flat end of a camming tooth of a lever 436, which is pivotally mounted on the shaft 425 and normally held in this rearward position by a spring pressed ball 437 mounted in the shaft 427 in a position to contact an arm 436A of the lever 436. While transferring values therein, the numeral wheels 420 of the grand-total register and their integral projections 435 are rotated in an additive or clockwise direction, therefore, when a numeral wheel has been moved nine steps from zero in said additive direction, its projection 435 will be disposed immediately under the camming tooth of the lever 436, and another additive step will rock the lever 436 to its forward position where it will also be held by the spring pressed ball 437 until restored by instrumentalities to be hereinafter described.

When the lever 436 has been rocked to its forward position, a lateral projection 436B of said lever will be in the path of a pin 438 protruding from both sides of a lever 438A pivoted on the member 421 at 438B and normally held with the pin 438 in its outward radial position by a spring 438C. It will be noted that the portion of the pin 438 (see also Figure 11) that projects into the plane of the gear 423 of the numeral wheel of higher order normally clears the gear teeth and the projection 436B of the lever 436, but when the projection 436B has been rocked to lie in the path of the pin 438, clockwise rotation of the pin 438 during a tens carrying operation will result in its being forced radially inward to pass under the projection 436B, and, in so doing, it contacts one tooth of the gear 423 of the numeral wheel of next higher order and displaces it one pitch distance thereby rotating the numeral wheel one step to effect a tens carrying operation. The clockwise rotation of the pin 438 is effected through the member 421 to which it is pivoted, said member being keyed to the shaft 422 which, as explained hereinbefore, makes two complete revolutions to effect tens carrying operations on all of the numeral wheels in the register.

Means have been provided whereby the lever 436 is restored to its rearward ineffective position immediately following a tens carrying operation. Wedge-shaped camming projections 421A of the members 421 are so arranged that they will contact any effective projections 436B of the levers 436 during rotation in either direction and restore them to their ineffective position, and, since the respective camming projections 421A immediately follow the pins 438 during the clockwise tens carrying revolutions, this restoration takes place immediately after the occurrence of a tens carrying operation.

Zero resetting mechanism

The clearance or zero-resetting operation of the grand-total register is accomplished through two revolutions of the shaft 422 in a counter-clockwise direction, said shaft serving to drive the numeral wheels by the friction caused by the tension of a leaf spring 420A (Figure 11), deformed into the circular recess between sleeve 421B and the interior of the numeral wheel 420 and retained against lateral displacement by the gear 423 on one side and the cam 421 on the other side, means being provided as hereinafter described to remove all resistance to free rotation of the numeral wheels. Any numeral wheel upon which a value is registered is stopped at zero position by the engagement of the pin 435 carried thereby with the flat end of the camming tooth of carrying lever 436 (Figure 12) the angle of engagement of said pin and said tooth being such that there is no tendency to rock the lever 436 about its pivot but said lever serves as a positive stop for the numeral wheel upon counter-clockwise rotation thereof. As all resistance to free rotation of the numeral wheels 420 is removed during a resetting operation, one revolution of the shaft 422 is sufficient to return said wheels to zero position, however, an additional safety factor is added by rotating said shaft twice as disclosed herein.

The only resistance to free rotation of the numeral wheels 420 (Figure 11) are the spring pressed pawls 424, which are provided with half-width keys disposed in the keyway of the shaft 425 so that the pawls may be rocked by the teeth of gears 423 without effecting oscillation of the shaft, but a counter-clockwise oscillation of the shaft through other instrumentalities will rock the pawls out of engagement with the gears 423 and permit free rotation of the numeral wheels 420.

Secured to the shaft 425 is an arm 425A (Figure 13) the side of which is held by spring pressure against a uni-directional cam 439, loosely mounted on the numeral wheel shaft 422 but so arranged that it is rotated only during the counter-clockwise clearance revolutions of the shaft 422 by means of a spring pressed plunger 439A, which contacts a radially extending surface in the bore of the cam 439, and which is ineffectively depressed during the clockwise tens-carrying revolutions of the shaft 422. Therefore, it is obvious that, during the clearance revolutions, the pawls 424 (Figure 11) are rocked out of engagement with the gears 423 by rotation of the cam 439 which rocks the arm 425A out of its normal seat in the periphery of said cam, and that, during a tens carrying revolution, the cam 439 remains stationary permitting said pawls to remain in engagement.

Drive and drive control

The plurality of gears that effect the successive or intermittent movements described above are mounted on the right hand end of the carriage, and are driven by the carriage drive shaft 440 (Figures 16 and 17) which has imparted to it a cycle of three revolutions in either direction upon depression of the correct operating key. During the transferring operation from the sub-total to the grand-total register, the drive shaft with its integral gear 440A (Figures 6 and 18) makes three complete revolutions in a clockwise direction, which, through the two idler gears 441 and 442 imparts one complete revolution in the opposite direction to the large gear 443, all of these gears being suitably mounted between the two plates at the right end of the carriage. Secured to the gear 443 is a mutilated gear 444 (see also Figure 7) coplanar with and adapted to mesh with a pinion 422A secured to the grand-total numeral wheel shaft 422.

The gears 443 and 444 are mounted on the hub 445A of another mutilated gear 445, and while rotating in a counter-clockwise direction, drive the gear 445 in the same direction, through the spring pressed plunger 445B which is similar in its operation to the plunger 439A described hereinbefore. The mutilated gear 445 through gears 446 and 447 drives the sub-total zero resetting pinion 409A secured to the sleeve 409. Since the mutilated gear 444 has twice the number of teeth as its driven pinion 422A, the pinion 422A will be given two revolutions in each cycle, and, since the mutilated gear 445 has the same number of teeth as its driven pinion 409A, said pinion is given one revolution in each cycle, and these gears are so arranged with respect to each other and with respect to their respective driven pinions, that upon rotation of the gear 443, the mutilated gear 445 first meshes with and rotates its pinion 409A for one revolution through the idler gears, and then rotates out of mesh before the other mutilated gear 444 rotates into mesh with its pinion 422A to rotate it the necessary two revolutions. The one revolution of the sleeve 409, it will be remembered, serves first to rock the grand-total numeral wheel gears into mesh with the idler gears of the sub-total register, and then to clear the sub-total register, which transfers the values standing thereon to the grand total register while the two following revolutions of the shaft 422 serve to perform a tens carrying operation in those orders of the grand-total register where a carry is determined.

Means are provided whereby the rotation of the carriage drive shaft 440 in a counter-clockwise direction serves to disable the drive to the mutilated gear 445 (Figure 8), therefore the sub-total register is left stationary during this operation while the grand-total register shaft is driven two revolutions in the opposite direction imparted to it by the mutilated gear 444 (Figure 7) which, as mentioned hereinbefore, are necessary to effect the zero resetting operation. Counter-clockwise rotation of the shaft 440 will, through the two idler gears 441 and 442, impart clockwise rotation to the large gear 443 and its integral mutilated gear 444, which, it will be remembered, served to rotate the mutilated gear 445 in the opposite direction through the spring pressed plunger 445B. However, the mutilated gear 445 (Figure 8) is held against clockwise rotation by a collar 448 (Figure 9) secured to said gear and a pawl 449 associated therewith, said pawl being journaled on shaft 425 and normally seated in a depression provided in the periphery of the collar 448 where it is held by suitable spring tension. The relative position of the pawl 449 and the depression in the collar 448 is such that the pawl locks the collar against clockwise rotation, but is rocked out of its seat in the depression during counter-clockwise rotation. It is obvious, then, that a revolution of the gear 444 (Figure 7) in a clockwise direction merely depresses the plunger 445B and performs no function other than rotating its pinion 422A two full revolutions in a direction to perform a resetting operation of the grand-total register.

Sub-total clear key

As described in the patent to Friden, No. 1,643,710, the calculating machine comprising the present invention is driven by a suitably mounted electric motor, which, through a series of speed reducing gears, serves to drive a pair of clutches as shown in Figure 20. Since the counter clear clutch merely effects a clearing operation of the counter register, and does not compose part of the present invention, it will not be described herein. However, the carriage drive shaft clutch, which is an essential part of the mechanism disclosed herein, is an exact replica of the main clutch described in the above mentioned patent, and will be described herein only in connection with the instrumentalities which effect its engagement. These instrumentalities are in the form of the sub-total and grand-total clear keys, the depression of the former serving to rotate the carriage drive shaft 440 for three revolutions in a clockwise direction, and the depression of the latter serving to rotate it a similar number of revolutions in a counter-clockwise direction. The function of this drive shaft while being rotated in either direction has been described hereinbefore.

Figure 19:
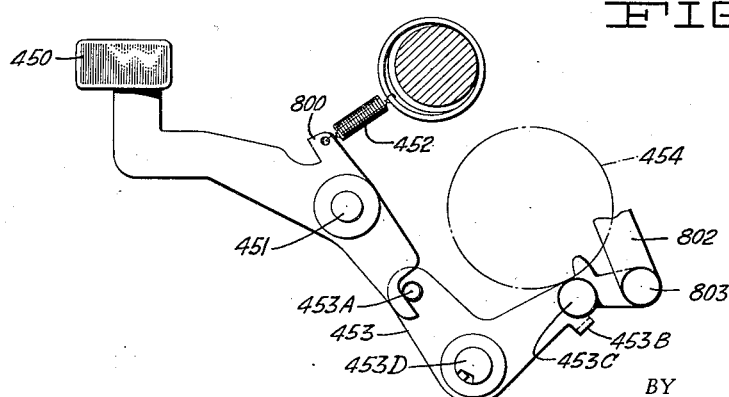
Figure 19 is a side view of the sub-total clear key and its associated clutch bellcrank.

Depression of the sub-total clear key 450 (Figures 3 and 19) pivoted at 451 and normally held in its elevated position by a spring 452, serves, through a pin 453A, to impart a clockwise oscillation to the clutch bellcrank 453, mounted on a shaft 453D which is suitably journaled in the side frame of the machine and which closes a contact to start the motor. This clockwise oscillation of the bellcrank 453 rocks it to permit engagement of the clutch 454 which, if the key 450 were immediately released, would normally permit said clutch to rotate one revolution before it was again disengaged by the clutch bellcrank 453. However, in the present construction, it is necessary that the bellcrank 453 be held out to permit engagement of the clutch for three revolutions, even though the key 450 has been immediately released. Rotatably mounted on a stud 457 (Figure 4) adjacent the clutch housing, is a gear 456, so arranged that it is advanced one tooth for each revolution of the clutch housing, by contact of a pin 454A, fixed on the side of said clutch housing, and in the path of which one tooth of said gear is held by a spring pressed pawl 458. Secured to the side of the gear 456 is a multiple cam 455 having one depression in its periphery for each three teeth in the gear. A projection 453B of the clutch bellcrank 453 is normally disposed in one of the depressions of the cam, and, upon a rocking of the bellcrank to permit engagement of the clutch, the cam is moved to position its extreme outer periphery under the projection 453B where it is held until the middle of the third revolution of the clutch or until three teeth of the gear have been tripped, at which time it drops into the next depression of the cam, consequently resulting in the disengagement of the clutch or a locking of the clutch housing in full cycle position at the end of this revolution. These three revolutions of the clutch housing 454 are transferred by its integral gear 454B (Figures 2 and 3) through a large idler gear 459 directly to the gear 461, and through another idler gear 463 to the gear 462 (see also Figure 20). The gears 461 and 462, being the same size as the clutch gear 454B, also rotate three revolutions per cycle on the sleeve 460, only in opposite directions, and can drive the sleeve 460 only through contact with a positive clutch element 464 which is slidably keyed to the sleeve 460 and normally held in contact with the gear 461 by a spring 465 (Figure 2). The sleeve 460 is rotatably mounted in the two right side frames of the machine, and is held against transverse movement by two collars fixed to its ends, one of which 466 is provided with a depression on its periphery into which a spring pressed centralizer pawl 467 (Figure 1) is seated, at full cycle position, thereby assuring correct engagement of the teeth on the sides of the clutch element 464 with the depressions in either gear 461 or 462. Obviously, then, the depression of the key 450 results in three clockwise revolutions of the sleeve 460, through contact of the clutch element 464 with the gear 461, and since the carriage drive shaft 440 is slidably keyed inside of the sleeve 460 to permit transverse movement of the carriage, a clearance operation of the sub-total register and the optional transferring of its values to the grand-total register will be accomplished with the carriage in any of its denominational positions.

Grand-total clear key

Depression of the grand-total clear key likewise results in the engagement of the clutch 454 for three revolutions, but also results in the shifting of the positive clutch 464 (Figure 2) to contact the gear 462, thereby transferring these three revolutions to the carriage drive shaft in the opposite or counter-clockwise direction, which as described hereinbefore, impart two clearance revolutions to the grand-total register shaft, but which do not affect the sub-total clearance shaft.

A lever 468 (Figures 2 and 3) pivoted at 469 in a manner to permit transverse displacement with respect to the machine, has a bifurcated forward extremity disposed in a groove of the slidable clutch element 464 so that the clutch is shifted on sleeve 460 by a movement of the lever 468. This movement is effected by a depression of a grand-total clear key 470 (Figure 3), pivotally mounted on a stud 471 of the machine frame and normally held in its elevated position by a spring 472. Said key is provided with a radially projecting portion 470A, contiguous with a camming surface 468A on the rear extremity of the lever 468, and so arranged that a depression of the key 470 shifts the clutch 464 (Figure 2) to contact the gear 462 reversing the direction of the carriage drive shaft 440.

In addition to effecting a reversal of the carriage drive shaft, a depression of the key 470 serves to effect engagement of the clutch 454 by means of a pin 470B (Figure 3) disposed between a bifurcated forward extremity of a rocking arm 473 so as to rock the same in a clockwise direction about its pivot point 474. The rearward extremity of the rocking arm 473 carries a pin 473A, so disposed between the bifurcated end of a clutch operating link 475 that, during depression of the key 470, the reversing shift is completed before the pin contacts the bottom of its seat in the link to effect depression thereof, and since the lower end of the clutch operating link 475 is journaled at 453C on the rear arm of the bellcrank 453, depression thereof effects engagement of the clutch 454 which engagement is maintained by the mechanism shown in Figure 4 until three revolutions have been completed. It will be noted that the construction of the described mechanism is such that depression of either key does not effect a movement of the other.

Interlocks

Means are provided to prevent the sub-total and grand-total clearance keys from being depressed simultaneously. The key 450 (Figure 3) is provided with a projecting portion 800 which, upon depression of this key, is disposed immediately beside a similar projection 801 on the lever 468 in such a manner that movement of said lever and depression of the key 470 are prevented. Conversely, upon depression of the key 470, the lever 468 is shifted in a position whereby its projecting portion 801 lies in the path of the key projection 800 which prevents depression of the key 450.

Means are also provided whereby the mechanism rendered operative by the depression of either key, automatically retains an interlocking effectiveness, preventing the depression of the other key until the necessary three revolutions have been completed. This is accomplished by an interlocking link 802, journaled on the rearward extremity of the clutch bellcrank 453 at 803 (Figures 3 and 19), and slidably supported at its upper end by the stud 474 which is disposed between a bifurcation thereof. This link 802 is normally held in its elevated position by a spring 804, which consequently rocks the clutch bellcrank 453 to its normal disengaging position at the end of a cycle. The initial depression of the grand-total clear key 470, as described hereinbefore, shifts the reversing clutch lever 468 so that a projection 805, provided thereon, is disposed immediately to one side of a portion 802A of the link 802, and further depression of the key 470 results in a downward movement of the link 802 so that the projection 805 of the lever 468 is wedged to the side of the portion 802A on which it is disposed, preventing movement of projection 805 and lever 468 until the mechanism shown in Figure 4 permits the bellcrank 453 and the link 802 to be returned to normal position. Conversely, upon depression of the sub-total clear key 450, it is obvious that the projection 805 of the lever 468 will be wedged on the opposite side of the interlocking link projection 802A until the necessary three revolutions have been completed.

We claim:

1. In a calculating machine, a register comprising a series of numeral wheels, a shaft on which said wheels are rotatably mounted, tens carrying means associated with said wheels, means operative by rotation of the shaft in one direction to operate the tens carrying means and means operative by a plurality of revolutions of the shaft in the opposite direction for frictionally returning the numeral wheels to zero.

2. In a calculating machine, a register comprising a series of numeral wheels, a shaft on which said wheels are rotatably mounted, overthrow preventing means associated with said numeral wheels, zero resetting means and tens carrying means for the numeral wheels carried by said shaft, a plurality of revolutions of said shaft in one direction serving to operate the tens carrying means, and a plurality of revolutions of said shaft in the opposite direction serving to release said overthrow preventing means and resiliently return said numeral wheels to zero.

3. In a calculating machine, a register comprising a series of numeral wheels, a shaft on which said wheels are rotatably mounted, tens carrying means associated with said wheels and requiring a plurality of revolutions of said shaft in one direction for its operation and zero resetting means associated with said wheels and arranged to be actuated by a plurality of revolutions of said shaft in the opposite direction.

4. In a calculating machine, a register comprising a series of numeral wheels, a shaft on which said wheels are rotatably mounted, overthrow preventing means associated with said numeral wheels, zero resetting means associated with said wheels and arranged to be actuated by rotation of said shaft in one direction, means for releasing said overthrow preventing means upon initial movement of said shaft in said direction, tens carrying means associated with said wheels and arranged to be actuated by rotation of the shaft in the opposite direction, and means for disabling said releasing means upon rotation of said shaft in said opposite direction.

5. In a calculating machine, a sub-total register, a grand-total register normally out of engagement with the sub-total register, tens carrying means associated with the grand-total register, means for resetting the sub-total register to zero, a shaft for rotating said zero resetting means, means controlled by said shaft upon initial movement thereof for causing engagement of the grand-total register with the sub-total register to transfer the values from the sub-total register to the grand-total register and disengage said register, means operative by further rotation of the shaft for actuating the tens carrying means of the grand-total register, and means for optionally disconnecting said transferring and disengaging means.

6. I a calculating machine, a sub-total register and a grand-total register, a single drive shaft for resetting said registers, a motor, a clutch interposed between said drive shaft and said motor, a reversing mechanism, a key to effect engagement of said clutch, a second key for effecting engagement of said clutch and operation of said reversing mechanism, and means actuated by said clutch to retain its engagement for a plurality of revolutions.

7. In a calculating machine, a motor, a plurality of registers, resetting mechanisms therefor, a single drive shaft for said mechanisms, said shaft being effective to operate one of said resetting mechanisms upon rotation in one direction and to operate another of said resetting mechanisms upon rotation in the reverse direction, a clutch between said motor and said shaft, manually operable means for engaging asid clutch, and means associated with said clutch for preventing disengagement of said clutch during a plurality of revolutions thereof.

8. In a motor driven calculating machine, a plurality of resetting mechanisms, a single driving train therefor including clutching and reversing mechanisms, manually operable means for engaging said clutch and selecting one of said resetting mechanisms for effective operation, and means controlled by said clutch for determining a plural cycle operation of the selected resetting mechanism.

9. In a calculating machine, a single driving train including clutching mechanism, zero-resetting mechanism driven thereby, means for initiating operation of said driving train, and means controlled by said train upon initial movement thereof for insuring a plural cycle operation thereof.

HAROLD T. AVERY.
GUSTAV LERCH.